Figure 1:
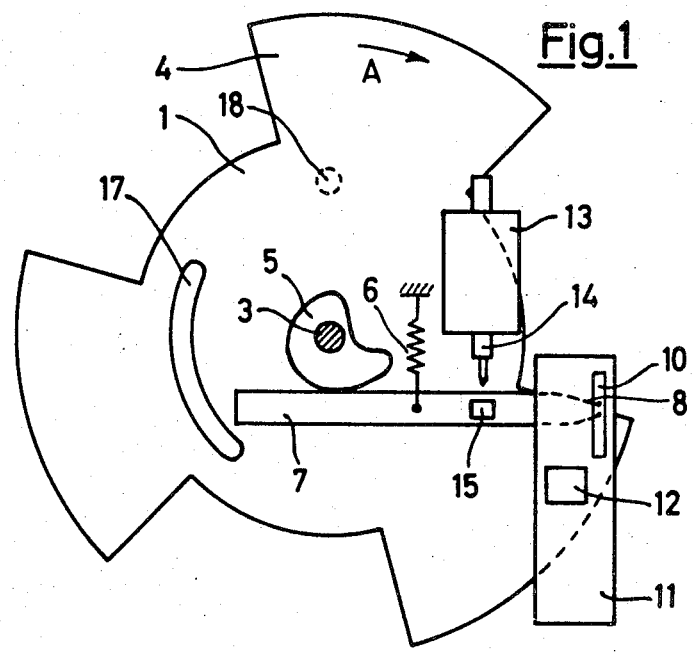

United States Patent

Kreutze et al.

[11] 3,851,959
[45] Dec. 3, 1974

[54] METHOD AND DEVICE FOR CONTROLLING A MOTION PICTURE PROJECTOR, ESPECIALLY A PROJECTOR FOR TEACHING MACHINES

[76] Inventors: Gerhard Kreutze, 2 Beethovenstrasse, 6901 Bammental; Manfred Moessner, 14 Hebelstrasse, 6991 Eppelhem; Guenther Obstfelder, 26 Im Enkler, 6906 Neim; Gerhard Soehring, 26 Untere Burggarten, 6901 Dossenheim; Victor Pfirrman, 46 Leuschnerstrasse, 6700 Ludwigshafen, all of Germany

[22] Filed: Mar. 15, 1973

[21] Appl. No.: 341,327

[30] Foreign Application Priority Data
Mar. 16, 1972 Germany.................... 2212176

[52] U.S. Cl.................... 352/177, 352/92, 352/169
[51] Int. Cl. ......................................... G03b 1/00
[58] Field of Search .......... 352/175, 176, 177, 169, 352/137, 124, 92

[56] References Cited
UNITED STATES PATENTS

| | | | |
|---|---|---|---|
| 1,944,024 | 1/1934 | Foster............................ | 352/124 X |
| 2,747,456 | 5/1956 | Waller............................ | 352/70 |
| 3,240,550 | 3/1966 | Mitchell......................... | 352/124 |
| 3,432,228 | 3/1969 | Hellmund...................... | 352/178 X |
| 3,520,596 | 7/1970 | O'Donnell..................... | 352/169 X |
| 3,533,688 | 10/1970 | Painton......................... | 352/169 X |
| 3,591,265 | 7/1971 | Shropshire.................... | 352/169 X |
| 3,690,752 | 9/1972 | DeRossi........................ | 352/169 X |

*Primary Examiner*—Monroe H. Hayes
*Attorney, Agent, or Firm*—Johnston, Keil, Thompson & Shurtleff

[57] ABSTRACT

A method and device for controlling a motion picture projector by signals, a first signal being derived from the rotation of a drive motor and a second signal from control marks on the film. In the case of projectors having a claw transport system and a sectored rotating shutter a first signal is derived from the rotation of the said shutter, whilst a second signal is produced, not only in the case of the said projectors but also in the case of other types of projectors, by control marks on the film and appropriate sensing elements. Reliable stopping of the film at a specific frame can thus be achieved, as can troublefree and automatic switching-off of the film transport drive at the end of the film.

6 Claims, 5 Drawing Figures

METHOD AND DEVICE FOR CONTROLLING A MOTION PICTURE PROJECTOR, ESPECIALLY A PROJECTOR FOR TEACHING MACHINES

The invention relates to a method and a device for controlling a motion picture projector, especially a projector for teaching machines, having a claw transport system and motor-driven film reels.

Especially in the case of projectors for teaching machines, it is necessary that the projector should automatically rewind the film to the beginning and automatically present the first frame containing instructional information. It is also necessary that the projector should stop the film at a specific frame and move the film forward or backward a predetermined number of frames. This applies, in particular, to teaching programs which are subdivided into separate lessons and where the projector has to locate the start of the lessons or the beginning of the film, these positions being determined either by control signals contained in the program, or by selector keys.

Methods and devices for detecting the beginning of the film or the stop positions within an educational film, by means of which actuating operations can be effected, are already known.

In film projectors it is known, for example, to measure the film tension by means of spring-loaded levers and to switch off the film drive, by means of switches, when the film has been rewound to the beginning. In order to ensure reliable switching-off with these means, they must be manufactured and set with great precision. It is also known to apply to the film reflecting marks which can be scanned electrooptically and used to switch off the film drive. Such reflecting marks may result in the film being damaged during winding and their application to the film is moreover time-consuming since there is little free space available on the film. Furthermore, it is known to include windows in the film, these windows being scanned by electrooptical means, for example by a photocell, and the signals produced serving to control the film drive. It is a particular disadvantage of the latter method that unintentional switching-off cannot be prevented without the use of elaborate circuitry because the photocell is otherwise unable to decide whether a light frame or a window is passing in front of it.

Motion picture projectors of the aforementioned type are also known in which the claw moves backward and forward relative to the film perforations and upward and downward in the direction of motion of the film and thereby moves the film frame by frame past the objective. The sectored rotating shutter serves to flash light onto the film in a specific rhythm which is matched to the film transport speed and is determined by the size and speed of rotation of the opaque sectors, so that at a minimum number of 16 frames per second the human eye "sees" continuous motion. Furthermore, it is known to prevent the claw from transporting the film by means of an electromagnet and thus to stop the film for the reproduction of a still picture. This electromagnet is actuated by a photoelectric component when the latter is illuminated through a slit in the shutter. However, this arrangement has the disadvantage that there is no correlation between the electromagnet and the running film.

An object of the present invention is to achieve very accurate and rapid stopping of the film, both during presentation of the film and during winding, with the aid of simple and reliable control means.

This object is achieved according to the invention with a method of controlling a motion picture projector, especially a projector for teaching machines, having a claw transport system and motor-driven film reels, wherein a first signal derived from the rotation of the drive motor and a second signal derived from a designation on the film are used for switching the film transport means on and off or for switching off the drive motor after the film has been wound onto one of the reels.

An advantageous device according to the invention for carrying out the process of the invention in a motion picture projector provided with a cam which rotates together with the sectored rotating shutter and actuates the claw which effects film transport, and with an additional actuating element by means of which the claw is prevented from transporting the film or is released for film transport, is characterized in that a first signal is produced in known manner by means of an illuminated slot located in the sectored rotating shutter and a photoelectric component which is located in the circular path in which the slot moves as the sectored shutter rotates, that the film carries optical control marks, through the illumination of which, in conjunction with at least one further photoelectric component, a second signal is produced, and that only if the first and second signals coincide is the claw disengaged from or brought into engagement with the perforation in the film through activation of an electromagnetic actuating element.

Synchronization of the shutter and the running film is thus achieved in a simple manner, so that starting and stopping of the claw transport only takes place when the claw is disengaged from the film, thus preventing the film or claw transport system from being damaged. This also makes it possible to stop the running film precisely and rapidly after a given number of frames have been transported, sufficient operational reliability being achieved.

A further advantageous embodiment of a device according to the invention for a motion picture projector having a sectored rotating shutter is characterized in that the film is provided with a transparent section extending at least in the longitudinal direction of the film, with which section there are associated at least two photoelectric components which, when illuminated, produce a second signal which enters a device which, after a minimum number of signals has been reached, switches off the drive motor, the minimum number of second signals consisting of groups of signals, the number of which is determined by a first signal produced by rotation of the shutter. As a result, the drive motor of the projector can be reliably switched off only within the transparent section of the film and at no other point and hence the film winding operation can be stopped without damaging the film.

In a further advantageous embodiment, the film is provided with optical marks, one or more of the said marks being associated with each frame of the film.

The running film can be stopped with the aid of these marks in a fraction of a second when it is being transported by the claw.

In a further advantageous embodiment of the device according to the invention optical control marks are provided within the frame but are outside the contour of the image projected onto a fixed screen, photoelectric components associated with the said marks being located approximately in the plane of the screen. Since the optical control marks lie outside the portion of the frame projected on the screen, they can be reliably identified by the photoelectric components.

Figure 2:
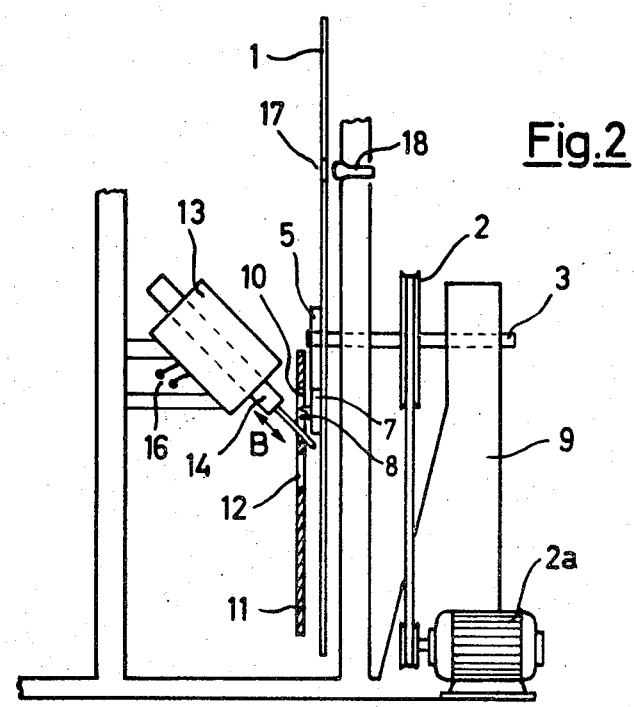
Figure 3:
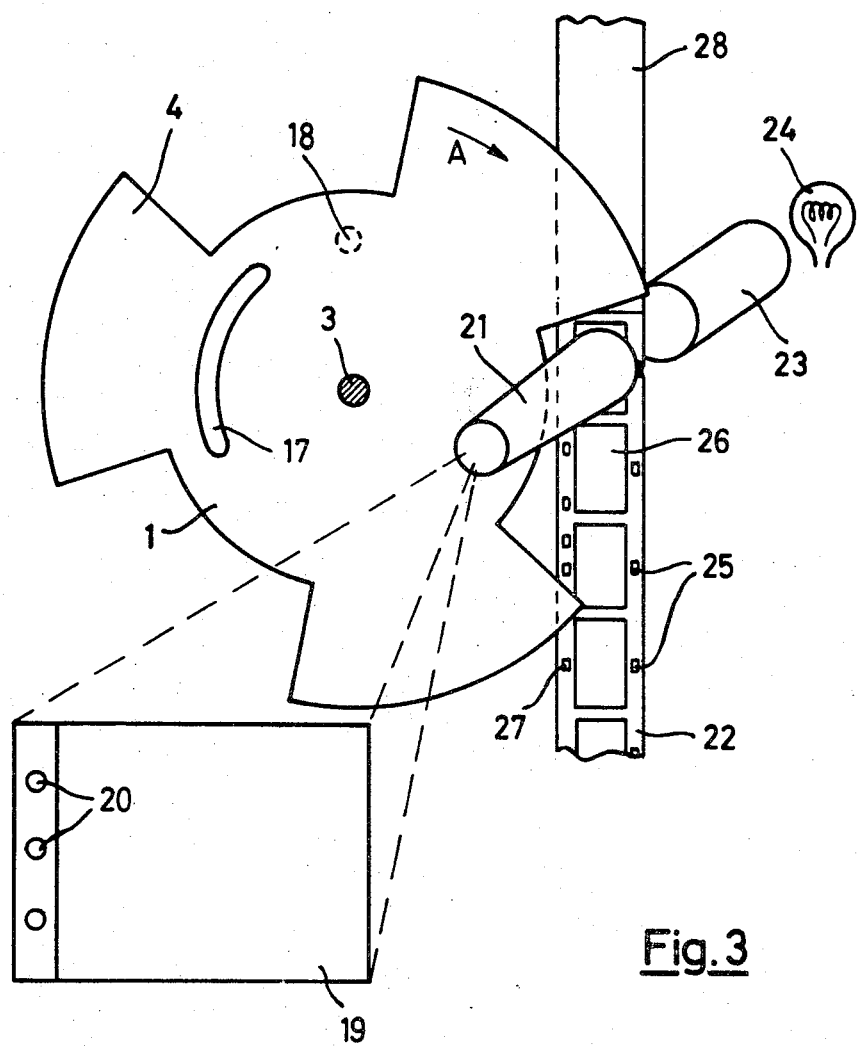
Figure 4:
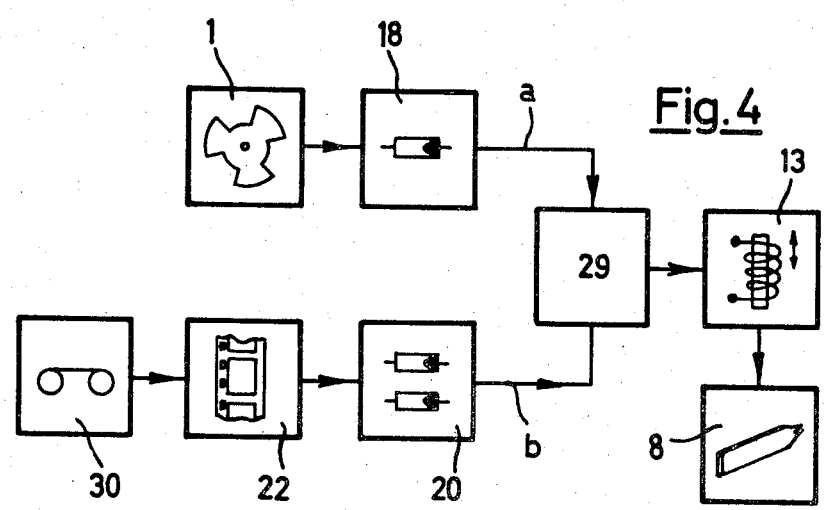
Figure 5:
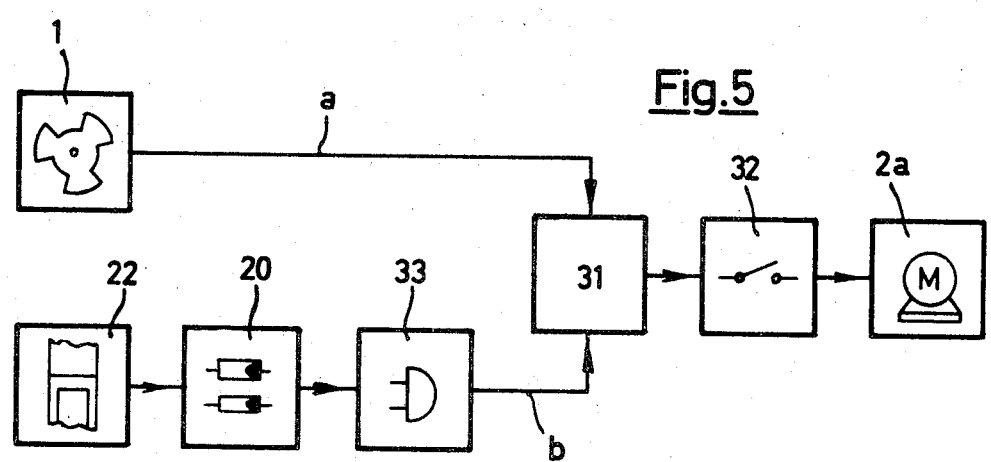

Further details of the invention are disclosed in the following description of a number of embodiments thereof illustrated in the accompanying drawings in which FIG. 1 is a front view of part of a motion picture projector, FIG. 2 is a side view of part of a motion picture projector including the parts illustrated in FIG. 1, FIG. 3 is a perspective schematic diagram of a projector with a sheet of ground glass as the screen, FIG. 4 is a block diagram of the electrical system employed in the device according to the invention for controlling the transport system, and FIG. 5 is a block diagram of the electrical system employed in the device according to the invention for switching off the film drive after the film has been rewound to the beginning.

A sectored rotating shutter 1 is rigidly attached to shaft 3 which can be driven by motor 2a via pulley 2. Immediately in front of shutter 1 which has three opaque sectors 4 of equal size there is arranged a cam 5 which is also rigidly attached to shaft 3 or shutter 1. The cam 5 is kidney-shaped and varies in thickness as is usual. Underneath the cam 5 there is arranged a movable lever 7 with claw 8 which is urged against said cam by means of tension spring 6 which is attached to the chassis 9 of the projector. The other end of lever 7 is usually additionally located in guide means (not shown) on the chassis 9. The claw 8 moves in a slit 10 at the side of film platform 11 in which there is provided a window 12 past which the film (not shown) is transported. Above the lever 7 there is located an electromagnet 13 with a member 14 which can be moved in the directions indicated by double arrow B and serves to block or release the lever 7 and hence the claw 8. A boss 15 against which member 14 bears when lever 17 is in the arrested position is provided on lever 7 below member 14. The solenoid 13 is mounted in an inclined position on one wall of the chassis 9 and is provided with terminals 16. There is arranged in the shutter 1, in the region of one of the opaque sectors 4, an arcuate slot 17 of given length as signal track. A photoelectric diode 18 provided with terminals is mounted on chassis 9 immediately behind the circular path in which the arcuate slot 17 moves. Photoelectric diode 18 may be replaced by a suitable photoelectric resistor, phototransistor or other photosensitive electrical component as sensing element for arcuate slot 17 which is illuminated from the front (cf. FIG. 1). The signal track may for example be in the form of a magnetic layer, a magnetic head being used as sensing element.

The mode of operation of the device is described briefly below. When solenoid 13 receives an electrical signal of sufficient amplitude, say a positive pulse of current of several hundred milliamperes, member 14 is forced outwards and strikes lever 7 which is displaced and disengaged from cam 5. As a result, claw 8 is withdrawn behind slit 10 and consequently no longer engages film perforation 25. Since arrestation of lever 7 also stops movement of the claw 8, transportation of the film is interrupted.

To keep the force exerted by solenoid 13 as low as possible, it is advantageous to match the point in time at which the lever is arrested to the point in time at which the lever is maximally displaced by the cam during normal operation because lever 7 is drawn toward chassis 9 by spring 6. If this is not done, at worst the maximum force of the spring would have to be overcome. Lever 7 is shown in FIG. 1 in a mid position. The lever 7 should theoretically be arrested when it is in its lowest position but can in practice also be arrested just before or after this position. The electromagnet 13 can be controlled for this purpose by arcuate slot 17 and photoelectric diode 18.

The projector shown schematically in FIG. 3 is provided with a screen 19 in the form of a sheet of ground glass onto which the image is projected from the rear. Three photoelectric elements 20 are arranged one above the other on the edge of the ground glass screen 19. At the back of the screen there are arranged one behind the other the objective 21, the shutter 1, a film strip 22, a condenser 23 and a projection lamp 24. The film strip 22 may, for example, be a super-8 film with perforations 25 on one side thereof, frames 26 and control windows 27. The film strip 22 is provided with a transparent leader 28. The shutter 1 is shown in the position it assumes shortly before the film is advanced by a frame, which, in the illustrated embodiment, occurs in the region of opaque sector 4 which is shown just above the upper edge of the frame which has just been projected when shutter 1 moves in the direction of arrow A.

FIGS. 4 and 5 show schematically the blocks through which the signals pass in order to initiate the actuating operation. FIG. 4 symbolizes the case where the film is to be stopped whilst it is being shown. The shutter 1 rotates synchronously with the claw transport system. Shutter 1 is constantly illuminated so that at each revolution of the shutter the photoelectric diode produces, as a result of the flash of light, a first electric signal $a$ which constitutes one of the input signals in coincidence gate 29. In a second branch of the circuit, the projector receives the command via a control unit, for example a tape recorder 30, to stop at a certain frame, for example when three transparent windows 27 appear (FIG. 3) and, for example, to present a still picture. The control marks 27 are sensed by photocells 20, and a second signal $b$ enters coincidence gate 29 which, for example, on receipt of the next first signal $a$, transmits the actuating impulse that energizes electromagnet 13 which arrests lever 7 and claw 8. The photoelectric diode 18 can also be connected to a counter which only transmits first signal $a$ to coincidence gate 29 after receiving a predetermined number of first signals $a$. It is thus possible, firstly, to set up a time lag between the control mark and the frame to be stopped and, secondly, to improve operational reliability by sensing the first and second signals or one of the two signals $a$ or $b$ several times. The length and position of slot 17 is so chosen that the actuating operation takes place approximately in the middle of slot 17. The position of slot 17 ensures at the same time that actuation of the magnet occurs when lever 7 is at its lowest position and hence only slight force exerted by the magnet is required to displace the said lever.

As a result, an electromagnet 13 of optimum force can be chosen. At the same time the claw 8 is prevented from being disengaged from the film or hindered by the magnet 13 or from even damaging the film during a transport operation. Synchronization of the moving film and the position of the shutter is thus achieved and the electromagnet is consequently switched on at a specific point in time. With this device it is possible to stop the film at a frame associated with a "stop" mark regardless of the speed the film is moving in order, for example, to show this frame as a still picture or to initiate the presentation of a series of pictures in forward or reverse motion. A power amplifier can be added behind coincidence gate 29 if more power than can be supplied by the incidence gate is required for activating the electromagnet 13.

Apart from the case described above, in which the photoelectric diode 18 is constantly activated when the film is running, diode 18 can also be activated, via a switch (not shown), by the second signal b produced by the film so that an additional coincidence gate 29 may not be required. It is possible to control the electromagnet 13 by the drop in current occurring in photoelectric diode 18 when it is covered by the opaque section of the shutter.

Claw 8 can also be disengaged from the film by the foregoing controlled actuating device when the film, for example when it is being re-wound or when a specific frame is being sought, is driven exclusively by motor 2a via only one of the film reels and is not transported by the claw. In this case, too, a control unit such as tape recorder 30 is advantageous for initial control. It is, of course, also possible to combine a logic circuit directly with the projector. In this operating state, the rotation of the shutter 1 and the movement of the film are of curse no longer synchronous with one another. The transparent leader 28 attached to film strip 22 serves, during rapid rewind, to detect the beginning of the film and to switch off the motor 2a before the film is damaged. So that light frames which may accidentally succeed one another do not cause unintentional switching-off of the film transport drive, steps must be taken to ensure that switching-off only occurs when the transparent leader 28 has been reached.

FIG. 5 shows a schematic block circuit for this purpose. The desired signal is produced when all control marks are simultaneously red as "light." The requirement of simultaneity can, in practice, be fulfilled by one or more AND gates 33, depending on how many photocells 20 are used. However, the signal is only evaluated if the "light" signals recur several times at the frequency at which shutter 1 lets the light beam pass. This condition can be fulfilled by the circuit if the signals b coming from the photocells 20 are counted by counter 31 in the rhythm of the light-and-dark frequency of the shutter sectors, and are stored. If counter 31 for example has a capacity of 10 impulses, then, provided that the three windows which are distributed over a length of film corresponding roughly to the height of a frame and denote "stop, beginning of film," the shutter 1 must rotate three and one-third times before the actuating command can be given. If, after this time, counter 31 contains 10 impulses b, it is discharged and switches off motor 2a via switch 32. The minimum number of signals b to be stored can be chosen to suit the intended application. It is particularly advantageous to employ, for each application, several photocells or similar components connected to a coincidence circuit since this considerably improves operational reliability in that incorrect actuation, which is particularly disadvantageous in the case of teaching equipment, is effectively prevented.

The method and device described above have been tested under field operating conditions in teaching machines. At the speed of 75 frames per second, during searching, it was possible to stop the film precisely at the searched-for frame. Equally precise stopping of the film was achieved at normal projecting speed (25 frames/second). Furthermore, it was possible to reliably stop the film after it had been rewound to the beginning without any damage to the film or projector.

While the present invention has been illustrated in connection with projectors, it is conceivable that it can be used for other applications.

While the invention has been particularly shown and described with reference to preferred embodiments thereof, it will be understood by those skilled in the art that other changes in the form and details may be made without departing from the spirit and scope of the invention.

We claim:

1. A method of controlling a film projector for use in a teaching machine, which further includes a tape recorder, the tape of which having signals recorded thereon for initiation or stopping the movement of a film in said projector, on said film there being provided with designations associated with the frames of said film, said designations being formed as optical marks which indicate each frame whether being a frame of a motion picture scene or being a frame for still picture presentation only; said projector including a cam which rotates together with a sectored shutter and actuates a claw for moving the film, and an additional actuating element by means of which the claw is prevented from engaging the film for movement or is released for film transport, the operation of said actuating element being controlled by signals derived from the rotation of the sectored shutter and from the movement of the film wherein the first of said signals (a) being produced by means of an illuminated slot in the sectored shutter and at least one photoelectric component located in the circular path in which the slot moves as the sectored shutter rotates and the second of said signals (b) being produced by means of said optical marks on the film and at least one further photoelectric component associated therewith, when an initial or stop signal from the tape recorder is fed to the projector the occurring of said signals (a) and (b) being detected and only when said signals (a) and (b) coincide a control signal activates to initiate or stop film movement.

2. A teaching machine which comprises in combination: a film projector having a sectored rotating shutter; a tape recorder; a tape playably mounted on said recorder, said tape having signals recorded thereon for starting or stopping the movement of a film in said projector, said film including optical marks which designate each frame of a movie film or a still picture; said projector including a cam which rotates together with a sectored shutter and actuates a claw for moving the film, and an additional actuating element by means of which the claw is prevented from engaging the film for movement or, is released for film transport, the operation of said actuating element being controlled by signals derived from the rotation of the sectored shutter and from the movement of the film wherein the first of said signals (a) being produced by means of an illuminated slot in the sectored shutter and at least one photoelectric component located in the circular path in which the slot moves as the sectored shutter rotates and the second of said signals (b) being produced by means of said optical marks on the film and at least one further photoelectric component associated therewith, when an initial or stop signal from the tape recorder is fed to the projector the occurring of said signals (a) and (b) being detected and only when said signals (a) and (b) coincide a control signal activates to initiate or stop film movement.

3. A teaching machine as described in claim 2 wherein each end of said film is provided with a transparent section extending in the longitudinal direction of the film in the form of a transparent leader.

4. A teaching machine as set forth in claim 2 wherein a coincidence gate is provided for the signals (a and b) derived from the rotation of the sectored rotating shutter and from the designation on the film, by means of which coincidence gate the members which move the film can be controlled, via actuating devices, only if the signals (a and b) occur in a predetermined time pattern.

5. A teaching machine as set forth in claim 4 wherein the coincidence gate used is an impulse counter.

6. A teaching machine as in claim 2 wherein said first signal (a) is produced by means of an illuminated slot in the sectored rotating shutter and at least one photoelectric component located in the circular path in which the slot moves as the sectored shutter rotates, and a second signal b being produced by means of illuminated optical marks on the film and at least one further photoelectric component associated therewith, the claw only being disengaged from or brought into engagement with the perforation in the film by the said additional actuating element which is activated when the first and second signals (a and b) coincide.

* * * * *

UNITED STATES PATENT AND TRADEMARK OFFICE
CERTIFICATE OF CORRECTION

PATENT NO. : 3,851,959
DATED : December 3, 1974
INVENTOR(S) : KREUTZE et al

It is certified that error appears in the above-identified patent and that said Letters Patent are hereby corrected as shown below:

In the Heading, insert -- Assignee: BASF Aktiengesellschaft, Ludwigshafen (Rhine), Germany --

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*